United States Patent
Hwang et al.

(10) Patent No.: US 9,818,097 B2
(45) Date of Patent: Nov. 14, 2017

(54) METHOD TO ACTIVATE ELECTRONIC PAYMENT UNIT IN MOBILE TERMINAL AND ACTIVITY SERVER THEREOF

(75) Inventors: Jin-Woo Hwang, Gyeonggi-do (KR); Young-Ju Kim, Gyeonggi-do (KR); Kyu-Hong Cheong, Seoul (KR)

(73) Assignee: Korea Smart Card Co., Ltd., Seoul (KR)

( * ) Notice: Subject to any disclaimer, the term of this patent is extended or adjusted under 35 U.S.C. 154(b) by 1358 days.

(21) Appl. No.: 12/075,170

(22) Filed: Mar. 10, 2008

(65) Prior Publication Data

US 2009/0043647 A1 Feb. 12, 2009

(30) Foreign Application Priority Data

Aug. 8, 2007 (KR) ........................ 10-2007-0079494

(51) Int. Cl.
*G06Q 40/00* (2012.01)
*G06Q 20/22* (2012.01)
*G06Q 20/04* (2012.01)
*G06Q 20/32* (2012.01)
(Continued)

(52) U.S. Cl.
CPC ......... *G06Q 20/223* (2013.01); *G06Q 20/045* (2013.01); *G06Q 20/32* (2013.01); *G06Q 20/322* (2013.01); *G06Q 20/327* (2013.01); *G06Q 20/3229* (2013.01); *G06Q 20/3278* (2013.01);
(Continued)

(58) Field of Classification Search
CPC ................................................. H04L 2012/5628
USPC .................. 705/13, 64, 67, 75, 44, 39, 7.11; 709/224, 237; 455/410, 411; 715/723
See application file for complete search history.

(56) References Cited

U.S. PATENT DOCUMENTS

| | | | |
|---|---|---|---|
| 6,386,457 B1 * | 5/2002 | Sorie | 235/487 |
| 7,702,578 B2 * | 4/2010 | Fung et al. | 705/39 |
| 7,917,144 B2 * | 3/2011 | Fingerhut et al. | 455/435.1 |

(Continued)

FOREIGN PATENT DOCUMENTS

| | | | |
|---|---|---|---|
| JP | 2003-084825 A | 3/2003 | |
| JP | 2005-301927 A | 10/2005 | |

(Continued)

OTHER PUBLICATIONS

"Mobile Felica Business Guide", *Mobile RF Magazine*, vol. 94 and *Card Wave*, (Sep. 15, 2004), 10 pgs.

*Primary Examiner* — Akiba Allen
(74) *Attorney, Agent, or Firm* — Schwegman Lundberg & Woessner, P.A.

(57) ABSTRACT

The present invention relates to an electronic payment means activating method and an activating server thereof. In the electronic payment means activating method, a usage approval of the inactive electronic payment means is requested by using first identification information of the inactive electronic payment means and personal user information of the user terminal, the first identification information is authenticated to determine usage approval of the active electronic payment means, a class of a user is detected by using the personal user information, a first parameter value corresponding to the detected class of the user and a usage approval message are provided to the user terminal, the first parameter value is established in the user terminal, the electronic payment means is activated, and a fare according to the first parameter value is paid by the electronic payment means.

29 Claims, 6 Drawing Sheets

(51) Int. Cl.
*G06Q 20/40* (2012.01)
*G06Q 20/42* (2012.01)

(52) U.S. Cl.
CPC ............ *G06Q 20/40* (2013.01); *G06Q 20/42* (2013.01); *G06Q 40/00* (2013.01)

(56) References Cited

U.S. PATENT DOCUMENTS

| | | | |
|---|---|---|---|
| 2005/0054438 A1* | 3/2005 | Rothschild et al. | 463/29 |
| 2006/0074765 A1* | 4/2006 | Crawford et al. | 705/26 |
| 2007/0061590 A1* | 3/2007 | Boye et al. | 713/186 |
| 2008/0214261 A1* | 9/2008 | Alderucci | 463/16 |
| 2008/0251580 A1* | 10/2008 | Van de Velde et al. | 235/380 |
| 2010/0299195 A1* | 11/2010 | Nix et al. | 705/14.17 |

FOREIGN PATENT DOCUMENTS

| | | |
|---|---|---|
| JP | 2006-309786 A | 1/2006 |
| JP | 2007-157045 A | 6/2007 |
| KR | 10-0387355 B1 | 5/2003 |
| KR | 10-2004-0094128 A | 11/2004 |
| KR | 10-2005-0050757 A | 1/2005 |
| KR | 10-2005-0018523 A | 2/2005 |

* cited by examiner

METHOD TO ACTIVATE ELECTRONIC PAYMENT UNIT IN MOBILE TERMINAL AND ACTIVITY SERVER THEREOF

CROSS-REFERENCE TO RELATED APPLICATION

This application claims priority to and the benefit of Korean Patent Application No. 10-2007-0079494 filed in the Korean Intellectual Property Office on Aug. 8, 2007, the entire contents of which are incorporated herein by reference.

BACKGROUND OF THE INVENTION (a) Field of the Invention

The present invention relates to an electronic payment service using a mobile terminal, a method for activating the electronic payment service, and an electronic payment means. Particularly, the present invention relates to an electronic payment means activating server and an activating method thereof in which an inactivated electronic payment means provided in a mobile terminal is activated to pay traffic fares, purchase prices, and official fees.

(b) Description of the Related Art

Recently, an electronic payment means has been provided in a mobile terminal to pay the cost of using various forms of transportation, including a bus or subway, to pay the cost of purchased products, or to pay official fees.

Payment methods using the electronic payment means include a previous-payment method and a post-payment method. In the previous-payment method, money is previously charged onto the electronic payment means, and the cost of using a predetermined service is subtracted from the charged money for each usage (e.g., a transportation fare). In the post-payment method, transportation fares incurred by a user are calculated by a bank or a mobile communication company to charge the user monthly.

A service using the payment methods is provided to a mobile terminal including the electronic payment means. Therefore, a mobile terminal manufacturing company launches a mobile terminal while the electronic payment means is mounted in the mobile terminal, or a user using a mobile terminal without the electronic payment means receives a chip or an electronic card including electronic payment means from a related company (e.g., a bank or a mobile terminal manufacturing company) to mount it into the mobile terminal.

However, since the mobile terminal including the electronic payment means is provided to a user while the electronic payment means is activated, an additional payment may occur in an undesired situation. For example, when a passenger using a transportation payment card or a credit card having a transportation fare payment function cannot be away from a transportation fare charging device after paying a transportation fare, an additional fare may be charged to the passenger by a mobile terminal of the passenger when the mobile terminal accidentally touches the transportation fare charging device. In addition, the transportation fares follow a transportation fare rule in which the transportation fare varies according to various classes (e.g., an elementary school student, a middle and high school student, a senior citizen, a handicapped person, an institutional recipient, a livelihood protection recipient, an adult, and so on), and a passenger breaking the rule may receive a fine. Therefore, the mobile terminal including electronic payment means having the transportation fare payment function is frequently used by users that are different from those registered to the mobile terminal, and therefore only adults may register the mobile terminal having the transportation fare payment function.

Further, when a chip or an electronic card is additionally mounted onto the mobile terminal, there may be inconvenience of asking for the chip or the electronic card, receiving it, mounting it onto the mobile terminal, and providing personal information.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an electronic payment means activating method for quickly activating an inactive electronic payment means in a mobile terminal according to a user's request, and an activating server thereof.

In addition, the present invention has been made in an effort to provide an electronic payment means activating method for paying a transportation fare according to a class of a user by an electronic payment means having a transportation fare payment function, and an activating server thereof.

According to an exemplary embodiment of the present invention, in an activating method of an inactive electronic payment means for a user terminal, a) a usage approval of the inactive electronic payment means is requested by using first identification information of the inactive electronic payment means and personal user information of the user terminal, b) the first identification information is authenticated to determine the usage approval of the active electronic payment means, c) a class of a user is detected by using the personal user information, d) a first parameter value corresponding to the detected class of the user and a usage approval message are provided to the user terminal, and e) the first parameter value is established in the user terminal, the electronic payment means is activated, and a fare according to the first parameter value is paid by the electronic payment means.

According to another exemplary embodiment of the present invention, in an activating method of an inactive electronic payment means by a user terminal, a) a usage approval request of the inactive electronic payment means is received from a user, b) an activating virtual machine for activating the inactive electronic payment means is operated, c) activation request information including first identification information of the inactive electronic payment means is generated by the activating virtual machine, and an activation request message including the activation request information is externally transmitted, d) a response message including a usage approval and a first parameter value of a class corresponding to personal information of the user are received in response to the activation request message, and e) the first parameter value is established, the electronic payment means is activated, and a fare according to the first parameter value is paid by the electronic payment means.

According to a third exemplary embodiment of the present invention, in an activating method of an inactive electronic payment means of a user terminal by an activating server, a) an activation request message including first identification information of the inactive electronic payment means and personal user information of the user terminal are received, b) the first identification information is authenticated to determine a usage approval of the inactive electronic payment means, c) the personal user information is used to determine a class of a user, and d) the usage approval and a first parameter value corresponding to the detected class of the user are provided to the user terminal.

According to a fourth exemplary embodiment of the present invention, an activating server for activating an inactive electronic payment means of a user terminal includes a transmitting/receiving unit, a service authentication unit, a class determining unit, and an activation information providing unit. The transmitting/receiving unit transmits/receives data through a wireless communication network. The service authentication unit performs usage authentication in response to an activation request for the inactive electronic payment means of the user terminal. The class determining unit determines a class corresponding to a transportation fare rule by using personal user information of the user terminal authenticated by the service authentication unit. The activation information providing unit generates usage authentication information and a first parameter value corresponding to the detected class information.

In the exemplary embodiments of the present invention, since the electronic payment means remains inactive when a user does not use the electronic payment means and the electronic payment means is remotely controlled to be activated when the user wants to use it.

In addition, an erroneous payment may be prevented when the user uses an additional electronic payment means and a mobile terminal having an activated electronic payment means.

Further, a transportation fare may be charged according to a class of the user by the electronic payment means.

DETAILED DESCRIPTION OF THE EMBODIMENTS

Figure 1:
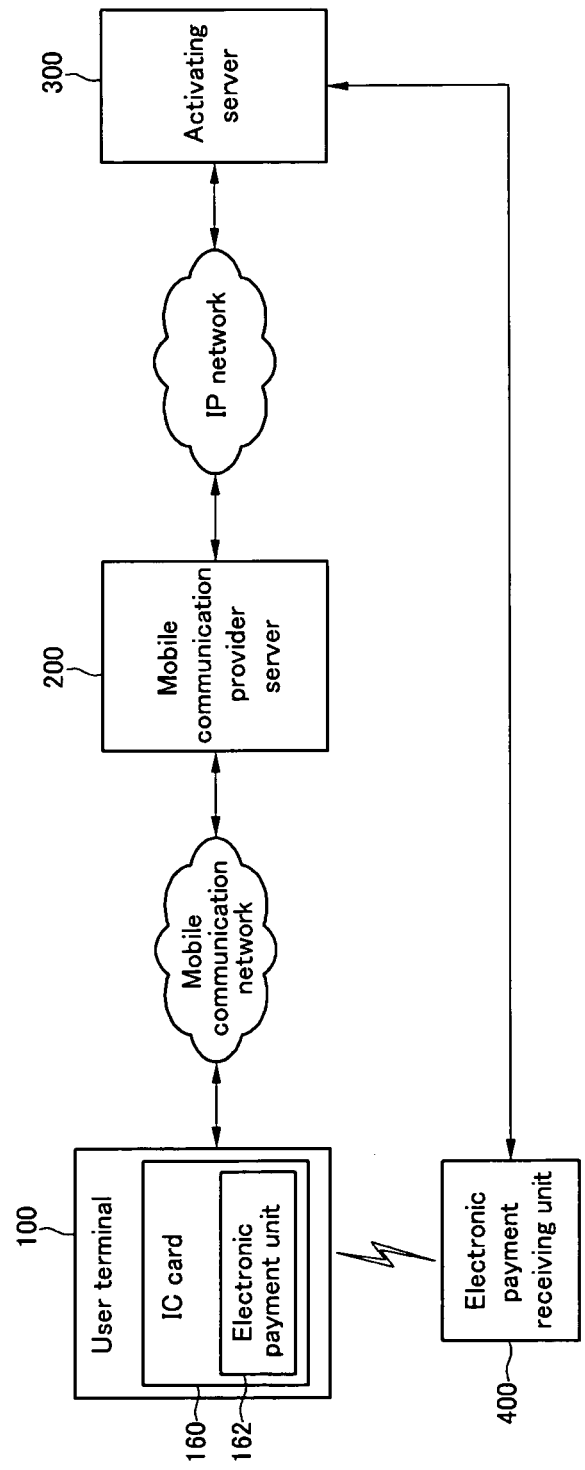
FIG. 1 is a diagram of an activating service system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements. Further, each of terms, such as "unit", "device", and "module" described in the specification mean a unit for performing at least one function or operation, and may be embodied by hardware, software, or a combination of hardware and software.

An electronic payment means activating server and an activating method thereof will now be described with reference to the figures.

FIG. 1 is a diagram of an activating service system according to an exemplary embodiment of the present invention. As shown in FIG. 1, an activating service system according to an exemplary embodiment of the present invention includes a user terminal 100 performing wireless data communication and including an inactivated electronic payment means, a mobile communication provider server 200 for managing subscriber information of each user terminal and providing the subscriber information of a corresponding user terminal 100 to an activating server 300 when receiving an activation request, and the activating server 300 for activating or updating the electronic payment means in the user terminal 100.

Here, the electronic payment means basically has a transportation fare payment function, and a function for paying the cost of purchased products or official fees.

The transportation fare payment function that is a main function of the electronic payment means will be primarily described.

The user terminal 100 may be a mobile communication terminal for performing data communication through a mobile communication network, or an Internet protocol (IP) terminal for performing communication through a wireless Internet network, including wireless broadband (Wibro), world interoperability for microwave access (WiMAX), and wireless LAN (WLAN).

In this case, all possible types of data communication methods (e.g., session initiation protocol (SIP), H.323, and over-the-air (OTA)) may be used to perform communication between the user terminal 100, the mobile communication provider server 200, and the activating server 300, and the present invention will be described using OTA in a mobile communication network environment.

The electronic payment means provided in the user terminal 100 while being inactivated remains inactive before an approval of the activating server 300, and a user sends an activating request. Here, the electronic payment means is a program (e.g., an applet) for performing a function requested by the user terminal in a previous-payment transportation card service or a post-payment transportation card service, and the program may be provided in the user terminal 100, a single chip having the program may be provided in the user terminal 100, or the program may be provided to an electronic card.

The electronic payment means has a function for charging money and subtracting a fare from the charged money in the previous-payment transportation card service, and a function for informing a corresponding organization of a fare incurred by a user in the post-payment transportation card service.

When the electronic payment means is provided in the electronic card, the electronic card may be a universal subscriber identity module (USIM) card, or a smartcard.

Generally, the USIM card is formed by combining a SIM card having subscriber authentication information and a universal IC card (UICC), and therefore the USIM card simultaneously has a subscriber authentication function of the SIM and an electronic payment means (e.g., transportation card and credit card) function of the UICC. Therefore, the electronic payment means (i.e., program) is provided to the UICC in the USIM card. In addition, the smartcard is an IC card having a memory and an operation unit (e.g., a microprocessor) without having subscriber authentication information, and the program performing the electronic payment means is provided to the memory.

Recently, the USIM card has been basically mounted onto a 3G mobile phone to activate Wibro in Korea. Hereinafter, the electronic card having an electronic payment means will be referred to as a USIM card 160, and the program performing the electronic payment means will be referred to as an electronic payment unit 162. A method for providing the electronic payment means to a single chip to provide electronic payment means to the user terminal 100 or for providing the electronic payment means to the user terminal 100 is well known to a person of ordinary skill in the art, and therefore detailed descriptions thereof will be omitted.

When receiving a usage request of the electronic payment unit 162 from a user while the electronic payment unit 162 provided in the user terminal 100 is inactivated, the user terminal 100 requests the usage (i.e., activation) of the electronic payment unit 162 to the activating server 300. In this case, the electronic payment unit 162 may not be activated by the user terminal 100. That is, the electronic payment unit 162 is formed with a different standard from an operating system (OS) of the user terminal 100, and therefore it is not possible to operate the electronic payment unit 162 without assistance of an additional program (i.e., an activating virtual machine (VM)). Even when the activating VM is provided, the electronic payment unit 162 is required to be registered to an accounting organization.

The mobile communication provider server 200 provides information for identifying an actual user of the user terminal 100, and it may not be needed if the actual user of the user terminal 100 is identified in another way.

The activating server 300 provides the activating VM, identifies and registers a subscriber requesting a subscription of transportation card service and the electronic payment unit 162, and provides parameter information used by the activated electronic payment unit 162 according to class information of the subscriber. Here, classes include a normal class, an elementary school class, a middle and high school class, a youth class, an undergraduate class, a senior citizen class, a handicapped class, an institutional recipient class, a livelihood protection recipient class, a welfare card class, and an employee class. Therefore, the electronic payment unit 162 pays different transportation fares for the respective classes according to the parameter information.

The electronic payment unit 162 may be provided to the user terminal 100 when the user terminal 100 is manufactured, or the user terminal 100 may download the electronic payment unit 162 (i.e., a program of applet form) from the activating server or an additional service server according to a user's request.

Figure 2:
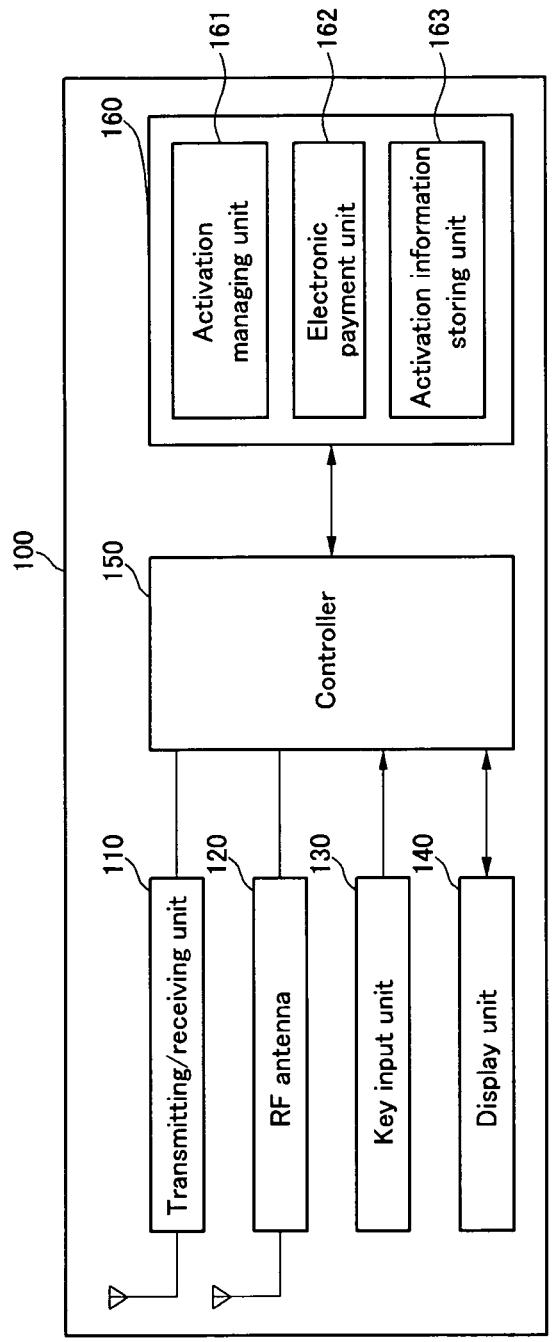
FIG. 2 is a block diagram of a user terminal according to the exemplary embodiment of the present invention.
Figure 4:
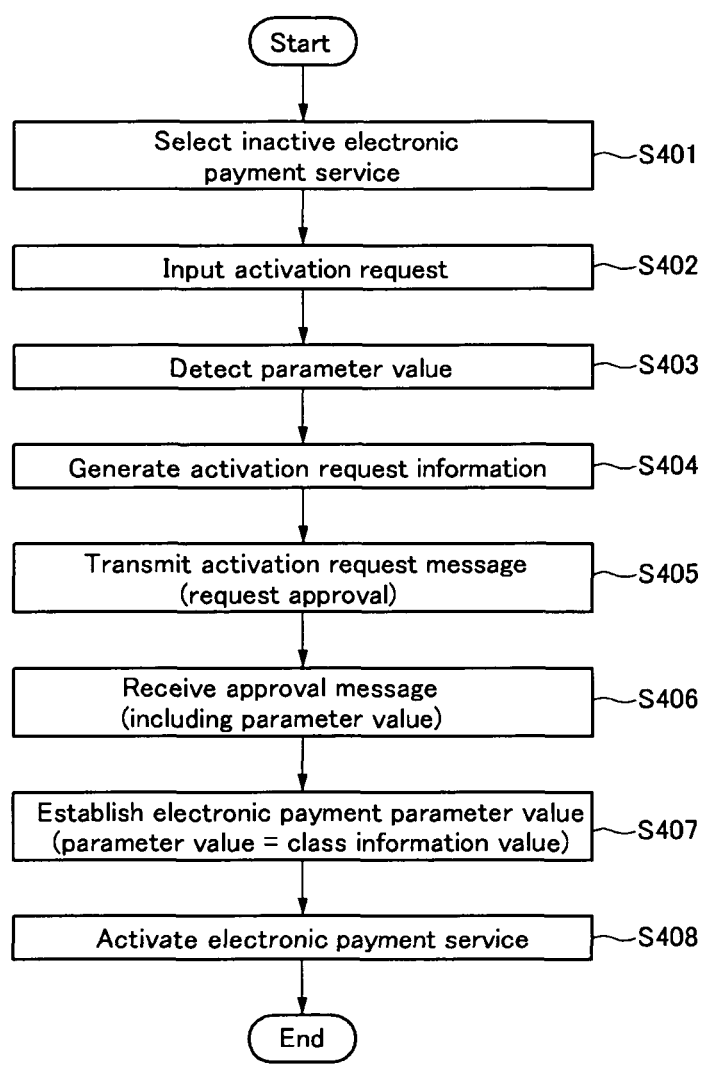
FIG. 4 is a flowchart representing an operation of the user terminal according to the exemplary embodiment of the present invention.

A configuration and an operation of the user terminal according to the exemplary embodiment of the present invention will now be described with reference to FIG. 2 and FIG. 4. FIG. 2 is a block diagram of the user terminal according to the exemplary embodiment of the present invention.

As shown in FIG. 2, the user terminal 100 includes a transmitting/receiving unit 110, a radio frequency (RF) antenna 120, a key input unit 130, a display unit 140, a controller 150, and a USIM card 160, and the USIM card 160 includes an activation managing unit 161, an electronic payment unit 162, and an activation information storing unit 163.

The controller 150 performs a controlling operation of the user terminal 100, the transmitting/receiving unit 110 performs wireless communication (e.g., OTA communication) to a mobile communication network, and the RF antenna 120 is connected to the USIM card 160 to pay a transportation fare through an electronic payment receiving unit 400 provided to a bus or a gate of a subway. The key input unit 130 generates a command signal corresponding to a user input, and the display unit 140 displays output information under the control of the controller 150. Here, the user terminal 100 may use a near field communication (NFC) device rather than using the RF antenna 120. The NFC communication device uses magnetic induction between neighboring devices based on a wireless local area network standard (Ecma 340, ISO/IEC 18092) to pay the transportation fare through the electronic payment receiving unit 400.

The activation managing unit 161 of the USIM card 160 activates the electronic payment unit 162 according to the control of the controller 150, and establishes and stores a parameter value according to the class in the activation information storing unit 163. The activation managing unit 161 includes the VM for activating the electronic payment unit 162, and performs an activating operation and establishes the parameter value according to the VM. Here, the activating VM may be provided to the user terminal 100 when the user terminal 100 is manufactured, or it may be downloaded from the activating server 300 when receiving the activating request.

The electronic payment unit 162 performs the electronic payment, and remains inactive before authentication of the activating server 300. The activation information storing unit 163 stores parameter values according to classes.

An activating request operation for the electronic payment means of the user terminal 100 will be described with reference to FIG. 4. FIG. 4 is a flowchart representing an operation of the user terminal according to the exemplary embodiment of the present invention, in which the activating VM is provided to the user terminal when the user terminal is manufactured. Here, the electronic payment means is used for the transportation card service.

A user controls the key input unit 130 to display a transportation card service icon on a screen. In this case, the displayed transportation card service icon shows that a transportation card service is in an inactive state.

The user selects the transportation card service icon in step S401 and requests activation of the selected transportation card service in step S402 to activate the transportation card service.

Therefore, the controller 150 operates the activation managing unit 161, the activation managing unit 161 detects a parameter value stored in the activation information storing unit 163 in step S403, and the activation managing unit 161 detects serial numbers of the USIM card 160 and generates activation request information including the detected information in step S404. The parameter value detected in step S403 is a null value for each parameter.

When activation information is generated, the activation managing unit 161 generates an activation request message (i.e., an approval request) including the activation information and transmits it through the transmitting/receiving unit 110 in step S405.

Subsequently, the activation managing unit 161 receives the activation information according to the activation approval of the activating server 300 through the transmitting/receiving unit 110 in step S406, and establishes the parameter values according to the classes in the activation information in step S407.

When the parameter value is established according to the classes, the activation managing unit 161 activates the electronic payment unit 162 in step S408 so that the electronic payment unit 162 operates in the OS of the user terminal 100.

In addition, when the activating VM is not provided to the user terminal 100, the user terminal 100 generates the activation managing unit 161 after receiving the activating VM from the activating server 300 and performs the steps S403 to S408.

Figure 3:
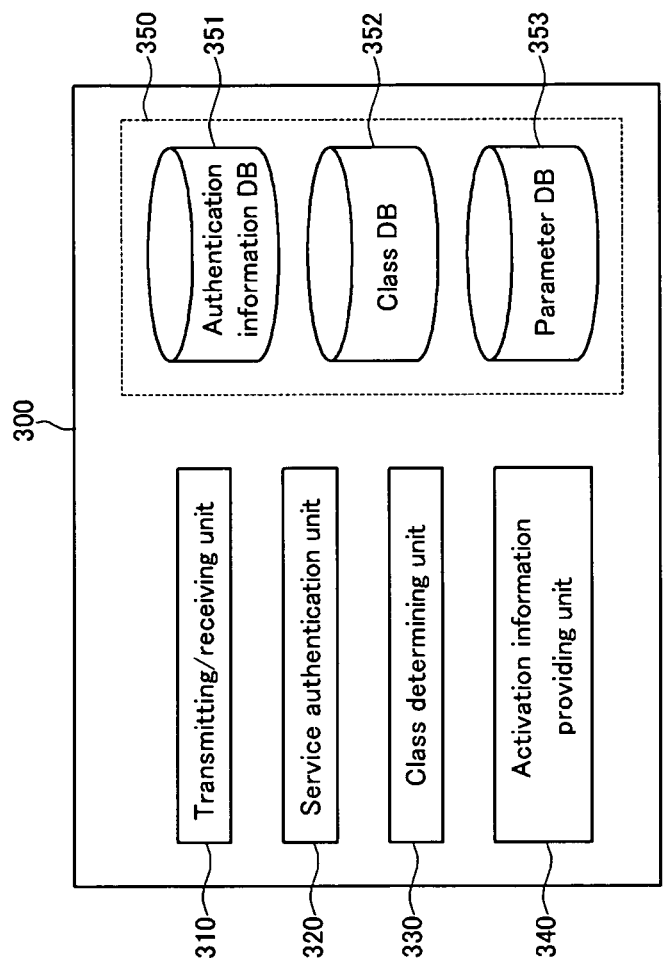
FIG. 3 is a block diagram of an activating server according to the exemplary embodiment of the present invention.
Figure 5:
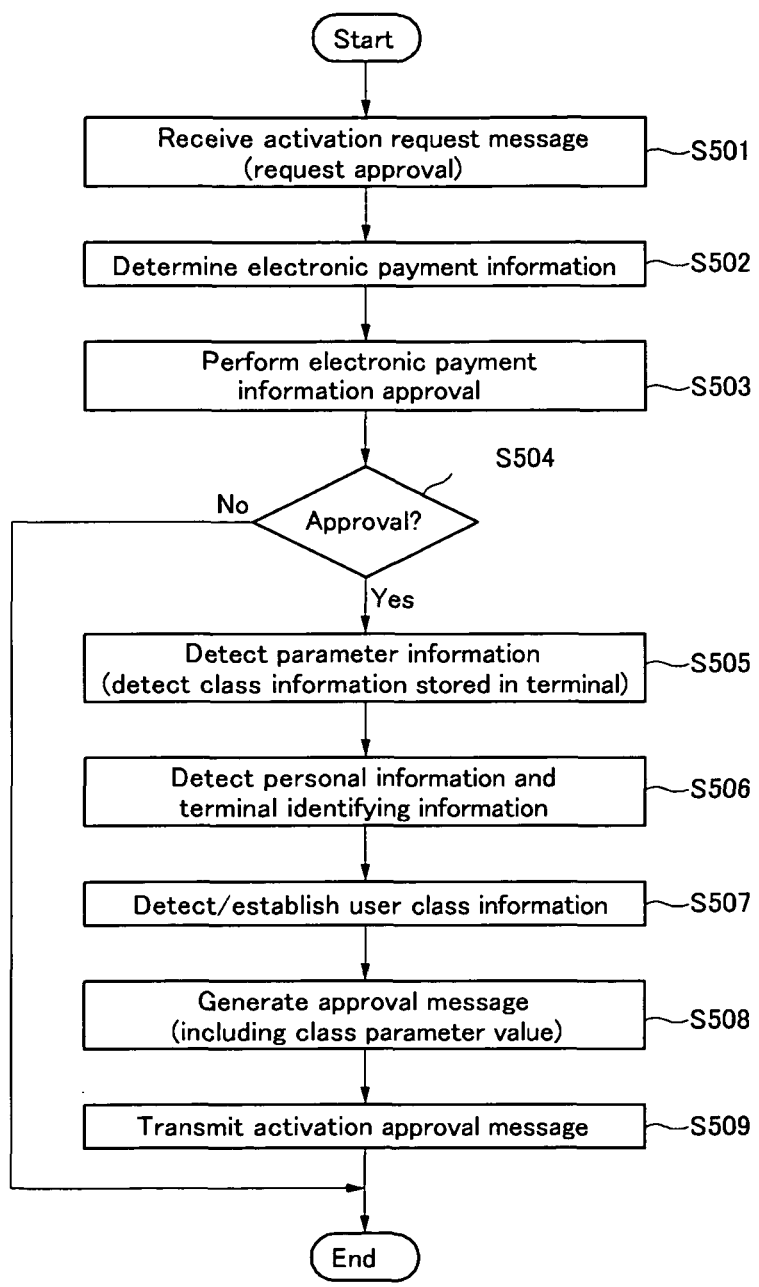
FIG. 5 is a flowchart representing an operation of the activating server according to the exemplary embodiment of the present invention.

A configuration and operation of the activating server according to the exemplary embodiment of the present invention will be described with reference to FIG. 3 and FIG. 5. FIG. 3 is a block diagram of the activating server according to the exemplary embodiment of the present invention.

As shown in FIG. 3, the activating server 300 includes a transmitting/receiving unit 310, a service authentication unit 320, a class determining unit 330, an activation information providing unit 340, and a database 350, and the database 350 includes an authentication information DB 351, a class DB 352, and a parameter DB 353.

The transmitting/receiving unit 310 transmits and receives data to/from the mobile communication provider server 200 or the user terminal 100, and the service authentication unit 320 performs usage authentication (i.e., activation authentication) in response to a transportation card service activation authenticating request. In this case, the authentication is approved when the authentication information received from the user terminal 100 and the authentication information stored in the authentication information DB 351 are the same. Here, the authentication information received from the user terminal 100 is information for identifying the electronic payment unit 162 (e.g., identification information of the USIM card 160, telephone numbers of the user terminal 100, or an IP address).

The class determining unit 330 detects class information corresponding to personal user information of the user terminal 100 from the class DB 352 and a government system (not shown) when receiving a user authentication success message from the service authentication unit 320. In this case, the government system includes organizations that manage information on the handicapped, the institutional recipient, and the livelihood protection recipient.

The activation information providing unit 340 provides the activating VM in response to a request of the user terminal 100, obtains the parameter value corresponding to the class of the class information detected by the class determining unit 330 from the parameter DB 353, and generates activation approval information including the obtained parameter value.

The authentication information DB 351 stores identification information of the electronic payment unit 162 to determine whether the electronic payment unit 162 provided to the user terminal 100 is managed by the activating server 300 and to approve the electronic payment unit 162. In this case, the identification information of the electronic payment unit 162 may be serial numbers of the USIM card or telephone numbers of the user terminal. The telephone numbers of the user terminal may frequently vary when the user changes mobile communication companies. Therefore, when the telephone number of the user terminal is used as identification information of the electronic payment unit 162, it is required to manage the telephone number change of the user terminal so that an error in identifying the electronic payment unit 162 may not occur.

The class DB 352 includes class determining information according to a transportation fare rule. For example, the class DB 352 includes code information for each class (e.g., a normal class, an elementary school class, a middle and high school class, a youth class, an undergraduate class, a senior citizen class, a handicapped class, an institutional recipient class, a livelihood protection recipient class, a welfare card class, and an employee class).

The parameter DB 353 includes the parameter values for the respective classes. For example, the parameter values include a maximum balance, an expiration date, a user identification code (a class identification code), and a discount rate.

An operation of the activating server according to the exemplary embodiment of the present invention will now be described with reference to FIG. 5. FIG. 5 is a flowchart representing an operation of the activating server according to the exemplary embodiment of the present invention.

When receiving an activation request message from the mobile communication provider server 200 through the transmitting/receiving unit 310 in step S501, the service authentication unit 320 extracts a serial number of the USIM card 160 from the activation request message in step S502, and uses the authentication information DB 350 to perform the authentication with respect to the extracted serial number of the USIM card 160 in step S503.

When the serial number of the USIM card 160 is approved in step S504, the service authentication unit 320 informs the class determining unit 330 of service approval, and the class determining unit 330 detects the parameter value before change from the activation request message in step S505.

The class determining unit 330 extracts the personal user information of the user terminal 100 from the activation request message to determine a name and an age of the user, provides them to an information organization system to determine whether the user is handicapped or is a livelihood protection recipient, and stores the class information matching the information of the corresponding electronic payment unit 162 in step S506.

Subsequently, the class determining unit 330 obtains the parameter value corresponding to the class from the parameter DB 353, generates an activation approval message including the obtained parameter value and activation approval information in step S508, and transmits them to the user terminal 100 in step S509.

Figure 6:
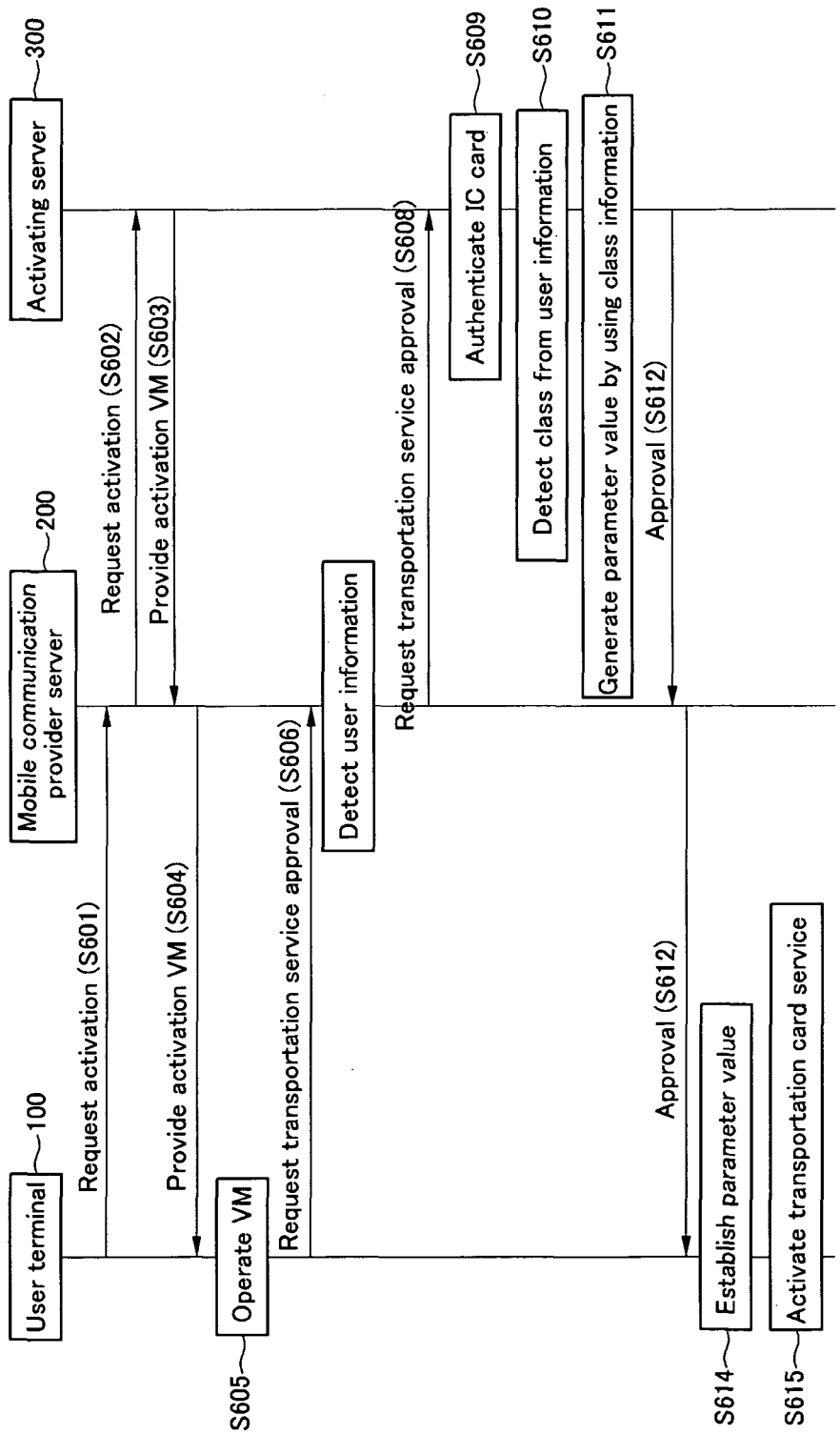
FIG. 6 is a data flowchart representing a transportation card activation method according to the exemplary embodiment of the present invention.

A transportation card activation method according to the exemplary embodiment of the present invention will now be described with reference to FIG. 6. FIG. 6 is a data flowchart representing the transportation card activation method according to the exemplary embodiment of the present invention. It will be assumed in FIG. 6 that the activating VM is not mounted into the user terminal.

The user selects an inactivated transportation card service icon from the user terminal 100 and sends an activation request. In response to the activation request from the user, the user terminal 100 provides a request of the activating VM to the activating server 300 through the mobile communication provider server 200 in steps S601 and S602.

The activating server 300 provides the activating VM for activating the electronic payment unit 162 in response to the request from the user terminal 100 to the user terminal 100 in steps S603 and S604, and the user terminal 100 generates the activation managing unit 161 and drives the activating VM in step S605.

The user terminal 100 requests approval for using the electronic payment unit 162 in step S606, and the mobile communication provider server 200 detects personal user information by the telephone number of the user terminal in response to the usage approval request in step S607 and adds it to the usage approval request to transmit it to the activating server 300 in step S608.

When receiving the usage approval request, the activating server 300 identifies the user and the electronic payment unit 162. When the electronic payment unit 162 is the registered electronic payment unit 162, the activating sever 300 approves the usage of the electronic payment unit 162 in step S609, identifies the user to detect the class thereof in step S610, generates the parameter value corresponding to the detected class in step S611, and provides it to the user terminal 100 through a usage approval message in steps S612 and S613.

Therefore, the user terminal 100 establishes the parameter value in step S614, and activates the electronic payment unit 162 so that the electronic payment means operates in step S615.

While it has been described in the exemplary embodiment of the present invention that the inactivated electronic payment means is activated, it is also easy for a person of ordinary skill in the art to inactivate the activated electronic payment means.

When the activated electronic payment means is inactivated, an inactivation request is sent while the personal user information of the user terminal 100 and the identification information of the electronic payment unit 162 are provided to the activating server 300. Thereby, the activating server 300 deletes the information on the registered user and provides an inactivating VM to establish the parameter value stored in the user terminal 100 to be a null value, so that the electronic payment unit 162 is activated.

In addition, a person of ordinary skill in the art may easily update the parameter value stored in the user terminal 100. The parameter value is updated (i.e., the class is changed) when the user of the user terminal 100 is changed, or the user grows older so that the class of the user is changed.

In this case, the parameter value is updated in response to a request from the user or by the activating server 300 counting an age of the user. When there is the request from the user, the class change is requested while the personal user information of the user terminal, the identification information of the electronic payment unit 162, and the parameter value before change are provided to the activating server 300, and therefore the activating server 300 determines whether the class is changed based on the personal user information, and provides the parameter value of the corresponding class to the user terminal 100 when the class is required to be changed. In this case, the parameter value before change is updated to be a newly received parameter value in the user terminal 100.

In addition, when the age of the user is counted by the activating server 300, the activating server 300 adds 1 to the age based on predetermined data (e.g., January 1$^{st}$), and detects the class corresponding to the changed age. Subsequently, when the class of the user is changed according to the age change, a class change message is provided and the parameter value corresponding to the class is provided to the user terminal 100. In this case, the parameter value before change is updated to be a newly received parameter value in the user terminal 100.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method comprising:
providing or using a user terminal including a software operating system;
providing or using an electronic payment unit included within the user terminal, wherein the electronic payment unit is used to pay a fare using a previous-payment method or a post-payment method, is inactive, and is operable to be activated by a software virtual machine;
activating the electronic payment unit using an activating server, including:
requesting at the user terminal an activation of the electronic payment unit by transmitting from the user terminal an activation request message to the activating server, the activation request message including a first identification information of the electronic payment unit and a personal user information of the user terminal;
authenticating at the activating server the first identification information;
detecting at the activating server a class of a user for the electronic payment by using the personal user information;
providing at the activating server a first parameter value corresponding to the detected class of the user;
generating and transmitting from the activating server to the user terminal an activation approval message including the first parameter value; and
establishing at the user terminal the first parameter value, activating the electronic payment unit based on the activation approval message, and
paying a fare according to the first parameter value by the electronic payment unit.

2. The method of claim 1, wherein the first identification information comprises one or more serial numbers of an electronic card including the electronic payment unit.

3. The method of claim 1, wherein the first identification information comprises a mobile phone number of the user terminal or an Internet protocol (IP) address.

4. The method of claim 1, wherein the electronic payment unit performs a transportation fare payment function.

5. The method of claim 1, wherein the electronic payment unit performs a purchase product cost payment function or an official fee payment function.

6. A method comprising:
providing or using a user terminal including a software operating system;
providing or using an electronic payment unit included within the user terminal, wherein the electronic payment unit is used to pay a fare using a previous-payment method or a post-payment method, is inactive, and is operable to be activated by a software virtual machine;

activating the electronic payment unit, including:
receiving at the user terminal an activation request for activation of the electronic payment unit from a user;
operating at the user terminal an activating virtual machine for activating the electronic payment unit;
generating at the user terminal using the activating virtual machine an activation request message including a first identification information of the electronic payment unit, and
externally transmitting from the user terminal the activation request message including the first identification information;
receiving at the user terminal a response message including an activation approval and a first parameter value of a class for an electronic payment corresponding to personal information of the user in response to the activation request message; and
establishing at the user terminal the first parameter value, activating the electronic payment unit based on the activation approval, and paying a fare according to the first parameter value by the electronic payment unit.

7. The method of claim 6, wherein in operating the activating virtual machine for activating the electronic payment unit, the activating virtual machine is previously stored at the user terminal.

8. The method of claim 6, wherein operating the activating virtual machine for activating the electronic payment unit further includes:
requesting from the user terminal that the activating virtual machine be downloaded to the user terminal, obtaining the activating virtual machine at the user terminal, and operating the obtained activating virtual machine.

9. The method of claim 6, wherein the first identification information comprises one or more serial numbers of an electronic card including the electronic payment unit.

10. The method of claim 6, wherein the first identification information comprises a mobile phone number of the user terminal or an Internet protocol (IP) address.

11. The method of claim 6, wherein the electronic payment unit performs a transportation fare payment function.

12. The method of claim 6, wherein the electronic payment unit performs a purchase product cost payment function or an official fee payment function.

13. A method comprising:
activating using an activating server an electronic payment unit, wherein the electronic payment unit included in a user terminal and is used to pay a fare using a previous-payment method or a post-payment method, including:
receiving at an activating server an activation request message that was generated by and transmitted from the user terminal, the activation request message including a first identification information of the electronic payment unit and a personal user information of the user terminal;
authenticating at the activating server the first identification information and determining an activation approval of the electronic payment unit;
using at the activating server the personal user information to determine a class of a user for making an electronic payment, the class determination based on the personal user information received in the activation request message;
generating at the activating server an activation approval message for the electronic payment unit; and
providing from the activating server to the user terminal the activation approval message that includes a first parameter value corresponding to the detected class of the user and activates the electronic payment unit included in the user terminal.

14. The method of claim 13, wherein the first identification information comprises one or more serial numbers of an electronic card including the electronic payment unit.

15. The method of claim 13, wherein the first identification information comprises a mobile phone number of the user terminal or an Internet protocol (IP) address.

16. The method of claim 14, further comprising, before receiving an activation request message including first identification information of the electronic payment unit and personal user information of the user terminal,
providing an activating virtual machine for activating the electronic payment unit according to a request of the user terminal to the user terminal.

17. The method of claim 16, wherein the electronic payment unit performs a transportation fare payment function.

18. An activating server for activating one or more electronic payment units, each of the one or more electronic payment units included within one of one or more user terminals and used to pay a fare using a previous-payment method or a post-payment method, the activating server comprising:
a transmitting/receiving unit for transmitting and receiving data through a wireless communication network coupled to the one or more user terminals, the transmitting/receiving unit operable to receive an activation request message from any given one of the one or more user terminals, and to transmit to the given one of the one or more user terminals an activation response message in response to the activation request message;
a service authentication unit coupled to the transmitting/receiving unit, the service authentication unit for performing usage authentication in response to the activation request message for the electronic payment unit of the given one of the one or more user terminals, the usage authentication based on a first identification information included in the activation request message;
a class determining unit coupled to the transmitting/receiving unit, the class determining unit for determining a class for an electronic payment corresponding to a transportation fare rule by using a personal user information of the given one of the one or more user terminals included in the activation request message after the given one of the one or more user terminals has been authenticated by the service authentication unit; and
an activation information providing unit coupled to the transmitting/receiving unit, the activation information providing unit for generating an activation approval information and a first parameter value, the first parameter value corresponding to the detected class information, the activation approval information that activates the electronic payment unit included in the user terminal and the first parameter value for inclusion in the activation response message generated in response to the activation request message.

19. The activating server of claim 18, wherein the first identification information comprises one or more serial numbers of an electronic card including the electronic payment unit.

20. The activating server of claim 18, wherein the first identification information comprises a mobile phone number of the user terminal or an Internet protocol (IP) address.

21. The activating server of claim 19, wherein the activation information providing unit provides an activating virtual machine for activating the electronic payment unit.

22. The activating server of claim 21, wherein the electronic payment unit, once activated, is operable to perform a transportation fare payment function.

23. The activating server of claim 22, wherein the electronic payment unit, once activated, is operable to perform a purchase product cost payment function or an official fee payment function.

24. The method of claim 1, further comprising, after establishing at the user terminal the first parameter value, activating the electronic payment unit, and paying a fare according to the first parameter value by the electronic payment unit,
    requesting at the user terminal an inactivation of the activated electronic payment unit to the activating server by using first identification information of the activated electronic payment unit and personal user information of the user terminal;
    authenticating at the activating server the first identification information and determining the inactivation of the activated electronic payment unit;
    providing at the activating server an inactivation approval message to the user terminal; and
    establishing at the user terminal the first parameter value as a null value and inactivating the activated electronic payment unit.

25. The method of claim 6, further comprising, after establishing at the user terminal the first parameter value, activating the electronic payment unit, and paying a fare according to the first parameter value by the electronic payment unit,
    receiving at the user terminal an inactivation request of the activated electronic payment unit from a user;
    operating at the user terminal an inactivating virtual machine for inactivating the activated electronic payment unit;
    generating at the user terminal inactivation request information including first identification information of the activated electronic payment unit by the inactivating virtual machine, and externally transmitting an inactivation request message including the inactivation request information;
    receiving at the user terminal a response message including an inactivation approval in response to the inactivation request message; and
    establishing at the user terminal the first parameter value as a null value and inactivating the activated electronic payment unit.

26. The method of claim 13, further comprising, after providing from the activating server the activation approval and a first parameter value corresponding to the detected class of the user to the user terminal,
    receiving at an activating server an inactivation request message including first identification information of the electronic payment unit and personal user information of the user terminal;
    authenticating at activating server the first identification information and determining an inactivation approval of the electronic payment unit; and
    providing from the activating server the inactivation approval to the user terminal.

27. The activating server of claim 18, wherein the service authentication unit performs usage authentication in response to an inactivation request for the electronic payment unit of the user terminal and the activation information providing unit generates an inactivation approval information.

28. The method of claim 1, wherein the software virtual machine is formed with a different standard from the software operating system of the user terminal.

29. The method of claim 1, wherein the software virtual machine is pre-stored in the user terminal.

* * * * *